(12) United States Patent  (10) Patent No.: US 8,079,650 B2
Tokach et al.  (45) Date of Patent: Dec. 20, 2011

(54) MODULAR TRACK TENSIONING SYSTEM

(75) Inventors: Thomas Tokach, Mandan, ND (US);
William Shelbroun, Bismarck, ND (US)

(73) Assignee: Clark Equipment Company, West Fargo, ND (US)

( * ) Notice: Subject to any disclaimer, the term of this patent is extended or adjusted under 35 U.S.C. 154(b) by 268 days.

(21) Appl. No.: 12/434,901

(22) Filed: May 4, 2009

(65) Prior Publication Data
US 2009/0273233 A1 Nov. 5, 2009

Related U.S. Application Data

(60) Provisional application No. 61/050,435, filed on May 5, 2008.

(51) Int. Cl.
 *F15B 11/08* (2006.01)
(52) U.S. Cl. ........................................ 305/146; 305/143
(58) Field of Classification Search .................. 305/125, 305/143, 145–147, 151, 153–155
See application file for complete search history.

(56) References Cited

U.S. PATENT DOCUMENTS

| | | | |
|---|---|---|---|
| 2,054,533 A | 9/1936 | Baker et al. | 74/242.14 |
| 2,506,619 A | 5/1950 | Schwartz | 305/10 |
| 2,717,813 A | 9/1955 | Gardner | 305/9 |
| 2,959,451 A | 11/1960 | Weber | 305/10 |
| 3,765,730 A | 10/1973 | Ishida | 305/10 |
| 3,826,543 A | 7/1974 | Muller | 305/10 |
| 3,944,196 A | 3/1976 | Schwartzkopf | 267/4 |
| 4,088,377 A * | 5/1978 | Corrigan | 305/147 |
| 4,223,878 A * | 9/1980 | Isaia et al. | 305/147 |
| 4,413,862 A * | 11/1983 | Ragon | 305/146 |
| 4,580,850 A | 4/1986 | Bissi et al. | 305/31 |
| 5,725,204 A | 3/1998 | Yoshida | 267/289 |
| 6,322,171 B1 | 11/2001 | Fornes | 305/143 |
| 7,229,140 B2 | 6/2007 | Page et al. | 305/151 |

FOREIGN PATENT DOCUMENTS

WO WO 80/00868 5/1980

OTHER PUBLICATIONS

International Search Report and Written Opinion.
Communication from the European Patent Office dated May 18, 2011 for European application No. 09742998.9, filed May 4, 2009.

* cited by examiner

*Primary Examiner* — Jason Bellinger
(74) *Attorney, Agent, or Firm* — John D. Veldhuis-Kroeze; Westman, Champlin & Kelly, P.A.

(57) ABSTRACT

A spring loaded track tensioning assembly for a track on a track driven vehicle has a spring subassembly that is retained on a spring shaft under a preload with a first fixed spring retainer and a second slidable spring retainer. The spring shaft has an outer end that extends beyond the second spring retainer and the outer end is slidably received in a bore in a piston or actuator shaft of a grease cylinder, with the end of the actuator shaft bearing on the second spring retainer. The grease cylinder contacts and applies a force to the second spring retainer, for initial positioning of the tensioning assembly, and additional loads on the first spring retainer that compress the spring cause the outer end of the spring shaft to slide in the bore of the actuator shaft as the second spring retainer slides along the spring shaft.

15 Claims, 8 Drawing Sheets

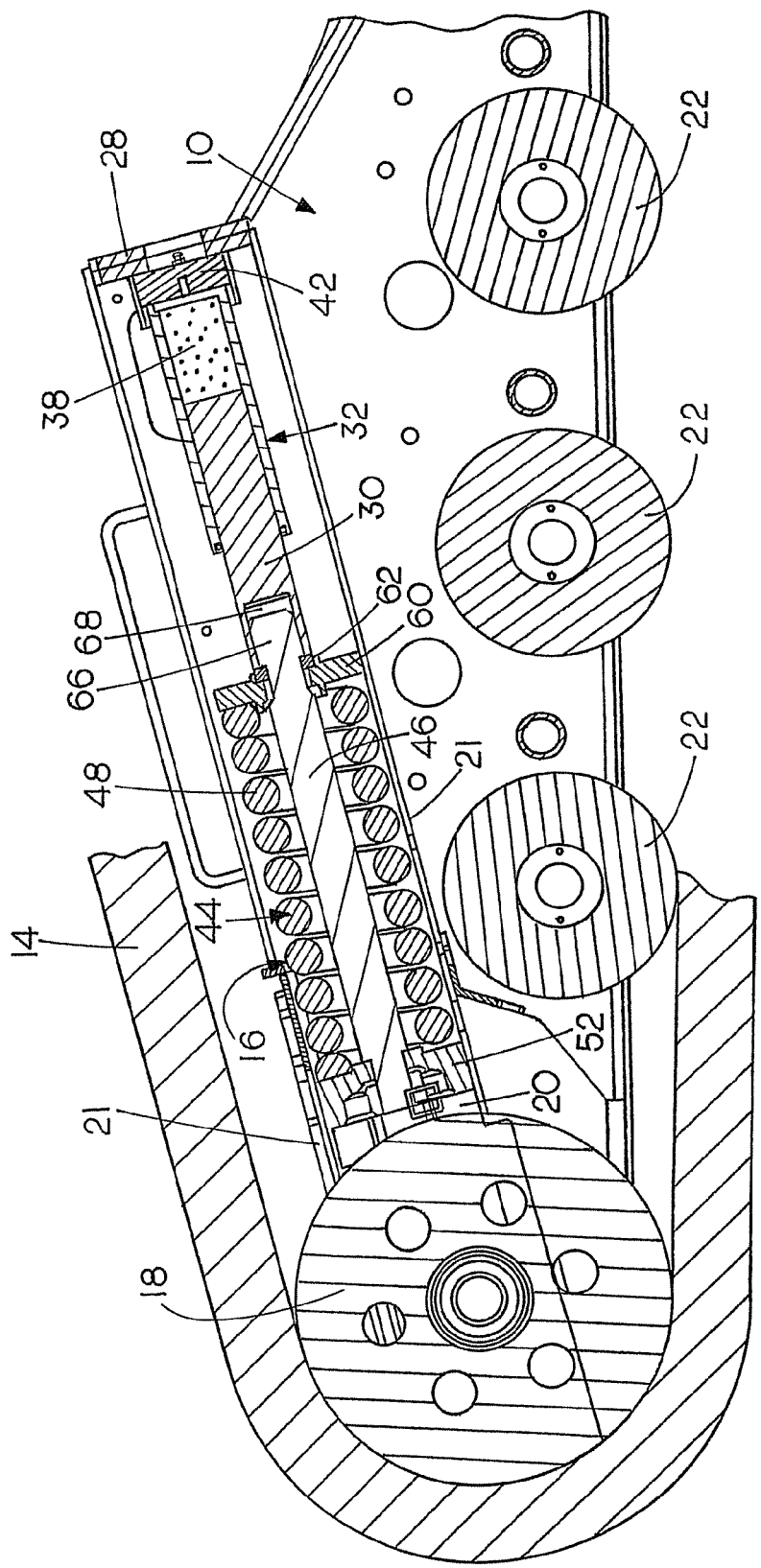

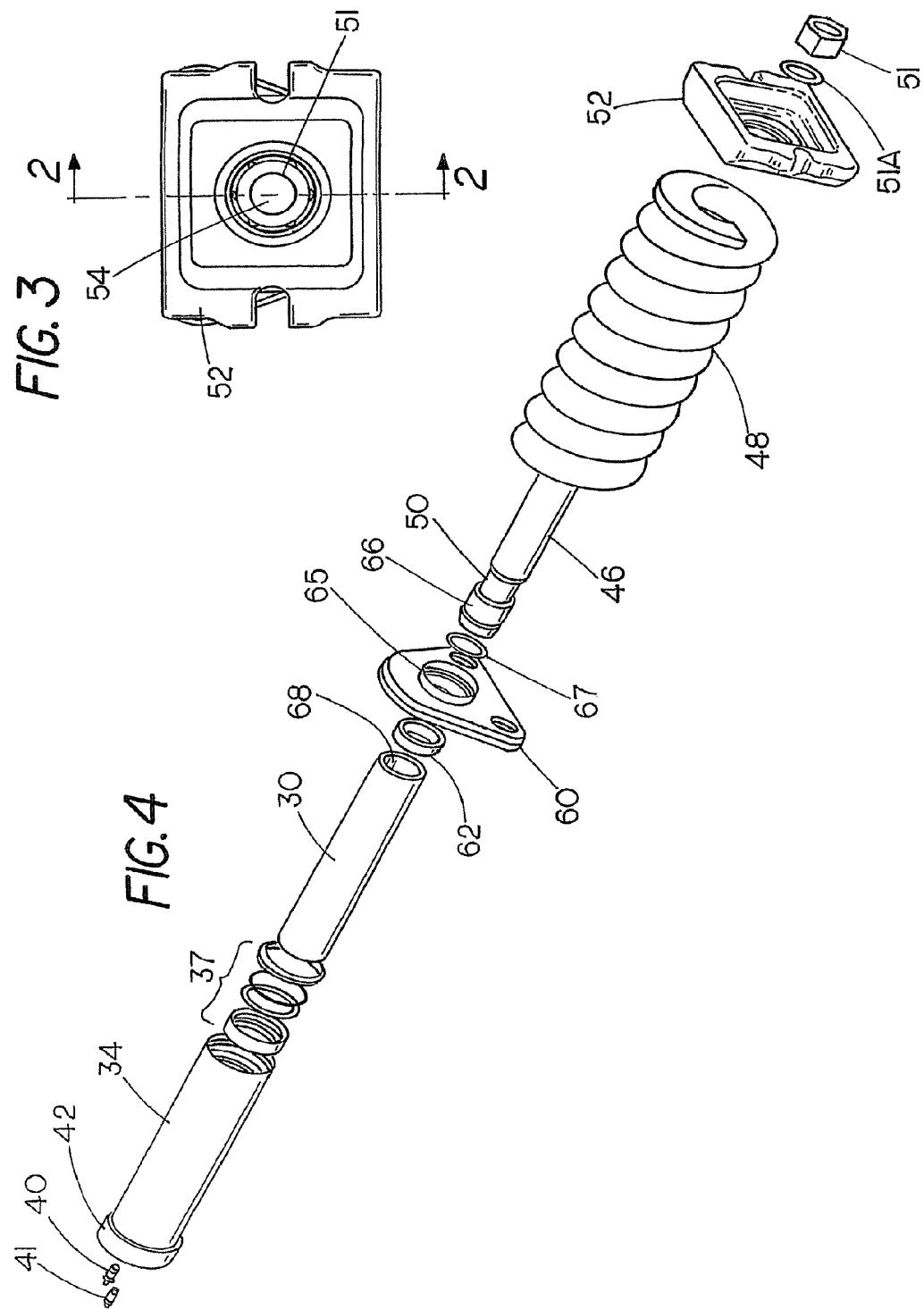

MODULAR TRACK TENSIONING SYSTEM

This Application refers to and claims the benefit of priority on U.S. Provisional Application Ser. No. 61/050,435, filed May 5, 2008, the content of which is incorporated by reference in its entirety

BACKGROUND OF THE DISCLOSURE

A track tensioning assembly or system is used for maintaining tension in a track for a track driven vehicle, and has replaceable spring modules for different loads and applications. A compression spring module is self contained and has a spring shaft that can be inserted and removed from a bore in a piston rod or shaft extending from a cylinder or actuator that provides pre-load for the tensioning assembly when the assembly is installed.

In the prior art, various spring loaded track tensioning devices have been used for track driven vehicles. A track tensioning assembly using a hydraulic cylinder is shown in U.S. Pat. No. 6,322,171, and a spring loaded track tensioning system that utilizes springs having two different spring rates is shown in U.S. Pat. No. 7,229,140. The prior art system shown in U.S. Pat. No. 6,322,171 uses a compression spring that is integral with the rod of the adjustment cylinder.

SUMMARY OF THE DISCLOSURE

The present disclosure relates a track tensioner or tensioning system for vehicle drive tracks that maintains a spring load on a track idler roller when the vehicle is in use. A modular spring assembly that can be preloaded has a spring shaft on which the spring used is mounted, as a unit. The spring shaft has an end portion that fits into a bore in a shaft or rod acting as a piston of a separable actuator or cylinder that as shown is grease filled. The assembly of the cylinder or actuator and the spring is mounted to provide track tension by coupling the spring to a track tensioning roller. The cylinder is actuated to compress the spring against the tension roller and place the track under a tension pre-load. The compression spring will compress or extend slightly as the tension in the track changes under working conditions. The spring is mounted on the spring shaft so it can compress and the spring shaft will slide in the bore of the cylinder shaft to permit some limited changes in the position of the tensioning roller, when the spring compresses from its preset position, as the loads on the track increase.

An aspect of the invention is that the pre-loading cylinder assembly, as shown a grease filled cylinder, can be pre-assembled, and different modular spring assemblies are adaptable for use with the same actuator or cylinder. The same actuator or cylinder can thus be used with different spring assemblies having different load capabilities and characteristics. The shaft or rod used as a piston rod in the grease cylinder is a separate part from the spring assembly, so that different replaceable spring assemblies can be coupled to the track frame or pod.

Additionally, the spring assembly has a spring plate retaining one end of the spring on the spring shaft that can be used in two different positions to achieve a different pre-load on the same spring when assembled onto the same spring shaft.

BRIEF DESCRIPTION OF THE DRAWINGS

FIG. 1 is a fragmentary side sectional view of a portion of a track frame and a portion of a track for a track driven vehicle having a track tension system made according to the present disclosure;

FIG. 3 is an end view of the device of FIG. 2 taken on line 3-3 in FIG. 2;

FIG. 4 is an exploded perspective view of the tensioner of FIG. 2;

FIGS. 6A-6D and 6A-1-6D-1 are perspective views of spring modules of the present disclosure having different sizes and spring rates;

DETAILED DESCRIPTION OF ILLUSTRATIVE EMBODIMENTS

Figure 2:
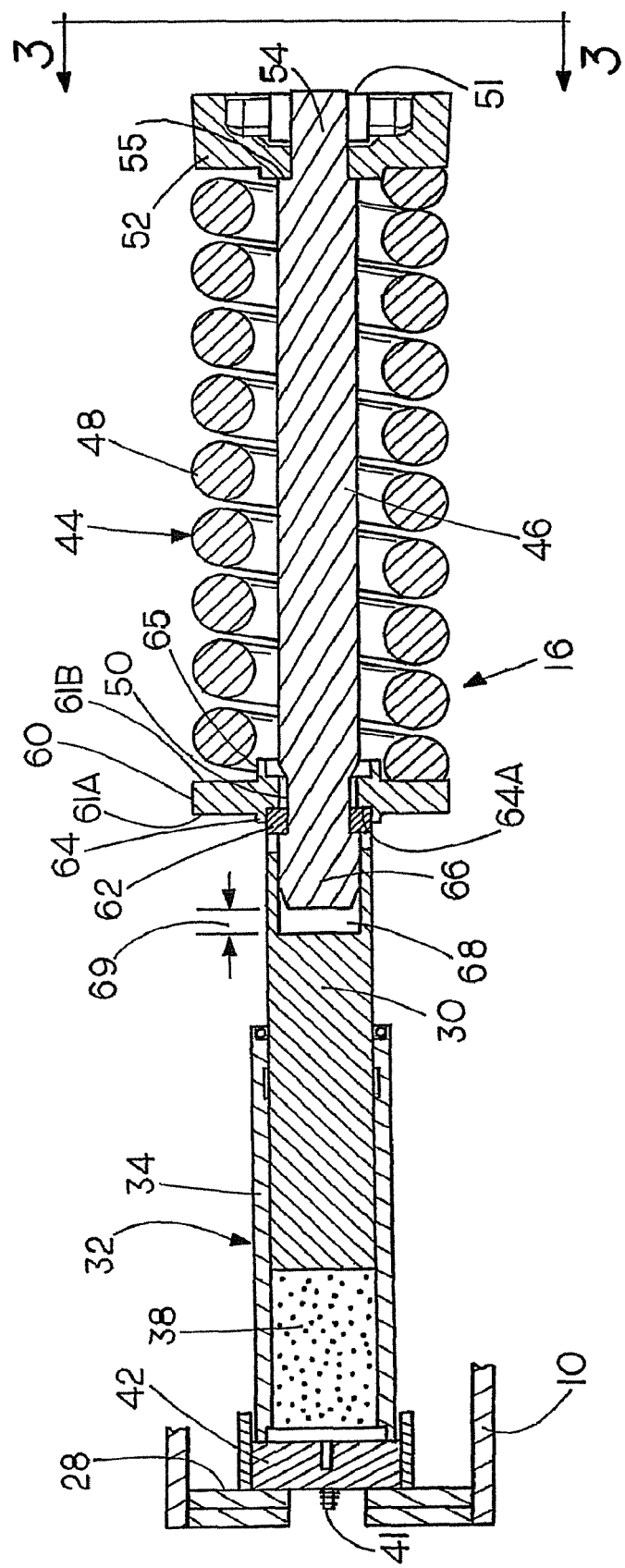
FIG. 2 is a longitudinal sectional view of the modular track tensioner of the present disclosure, taken on line 2-2 in FIG. 3 and rotated 180 degrees from the showing in FIG. 1.

A track frame 10 of a track driven vehicle mounts track drive sprockets (not shown) for driving an endless track 14. The track 14 is a conventional rubber or steel track and is maintained under tension with a tensioner assembly 16 made according to the present disclosure. The tensioner assembly 16 is mounted in the frame 10, in a conventional manner, and includes an idler tension roller 18 that is rotatably mounted in a slide support 20 shown for illustrative purposes. The slide support 20 is slidably guided in support guide members 21, for generally fore and aft sliding as shown. The slide support 20 can be separately guided so the spring from the tensioner assembly applies compression loads on the tensioning roller 18, through a conventional mounting or arrangement, for example, as shown in U.S. Pat. No. 6,322,171 or U.S. Pat. No. 7,229,140, and thus places track 14 under tension. The track 14 is also supported on bottom rollers 22.

The support members 21 also retain the tensioner assembly 16 in position, and permit movement of the slide support 20 to maintain a spring load on the slide support and tension roller 18 to exert tension on the track 14.

Referring to FIG. 2, the tensioner assembly 16 is shown in cross section. Schematically shown is a portion of the track frame 10, that has an end wall 28 against which the tensioner assembly 16 reacts loads that are applied to the slide support 20 and idler roller 18. The tensioner assembly includes an actuator or cylinder subassembly or module 32, as shown a grease cylinder, which includes an outer cylinder tube 34 with an interior bore 38 and a hardened piston shaft 30 that slidably fits inside the interior bore 38. The bore 38 is filled with grease (in the form shown) between the end of the piston rod or shaft and the base end block 42 of the outer cylinder tube 34 to control the overall length of the tensioner assembly 16 when installed and to provide for pre-tensioning the tensioner assembly. Hydraulic cylinders or mechanical actuators can be used. In the form shown, a grease zerk 40 is provided through the end block 42 of the outer cylinder tube 34, for filling the bore 38 with grease to extend the shaft 30 a desired amount.

A bleed screw 41 can also be provided to bleed out grease when the overall preload or dimension of the tensioner assembly 16 is to be changed.

A spring module indicated generally at 44 is a subassembly or module, and includes a central spring shaft 46, and a compression spring 48. The central spring shaft 46 has an elongated, annular retaining groove 50 formed adjacent an end thereof. It can be seen that shaft 46 is on the interior of the spring 48. A spring push block 52 is retained on a reduced threaded end 54 of the spring shaft 46 opposite from the groove 50, and the push block 52 is held in place against a shoulder 55 on the shaft with a suitable nut 51. The spring push block 52 has a perimeter that bears against the spring 48, and the push block also loads the slide 20 under spring force.

The retaining groove 50 is used for slidably receiving a split retaining ring or lock collar 62 for in turn retaining a slidable and reversible spring retainer end plate 60 on the shaft 46 with the lock ring in a stopped position against a shoulder at the end of the annular groove 50. Spring end plate 60 retains the opposite end of spring 48 from push block 52 on the shaft 46, so the spring can be under a preload between the push block and the spring plate. The spring plate 60 has a first interior bore recess on a first side 61A (see FIGS. 2 and 5A), formed by an annular lip 64 that fits around the split retaining ring or lock collar 62. The split retaining ring 62 in turn slidably seats into the annular groove 50 to permit an end portion 66 of the shaft 46 to slide farther into a bore 68 when the spring is compressed from the position shown in FIG. 2. The remote end of the groove 50 (adjacent end portion 66) stops movement of the lock collar 62 to hold the spring 48 on the shaft 46. The lock collar 62 seats on a shoulder 64A in the first recess to react spring force.

Figure 5:
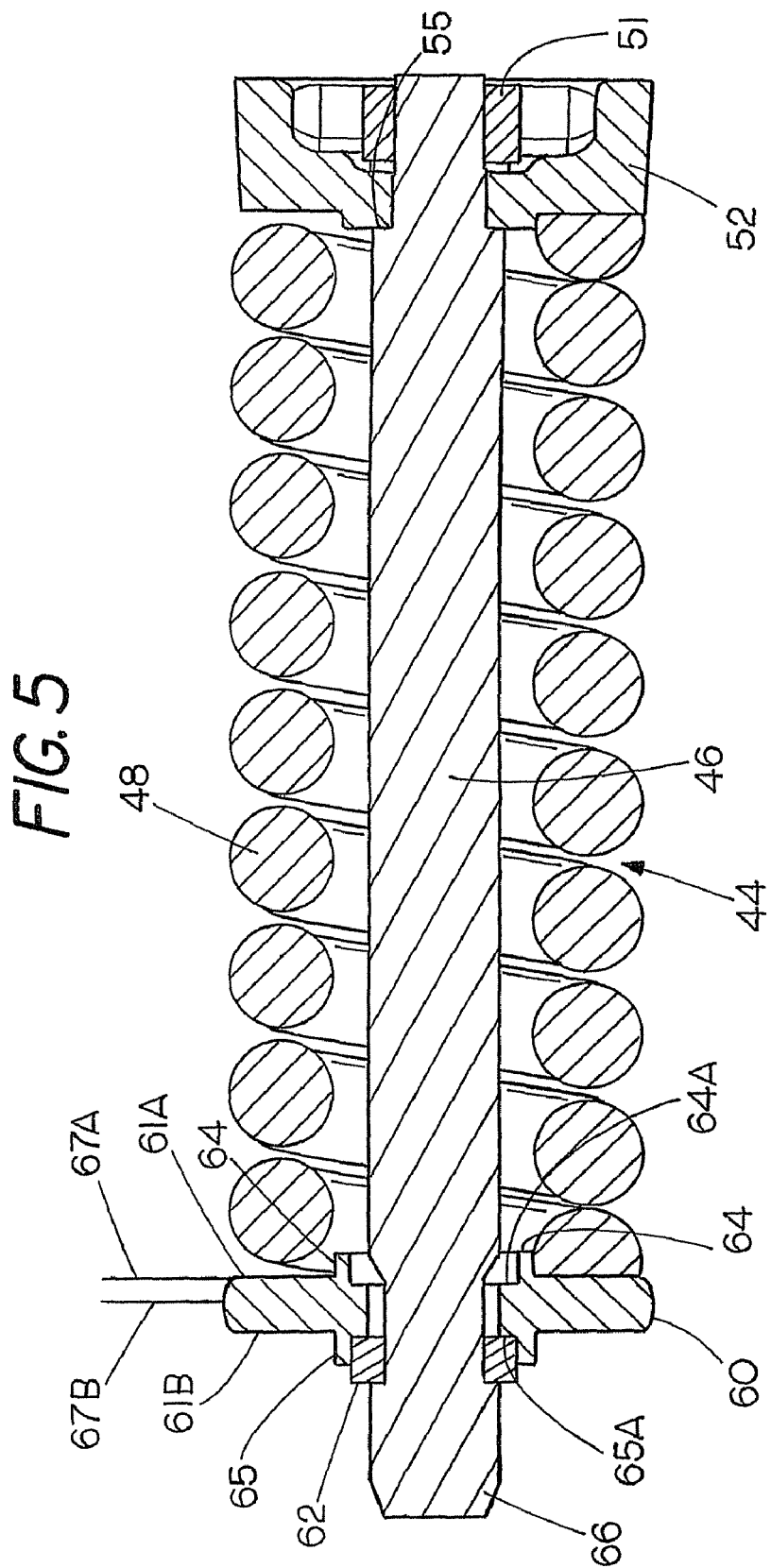
FIG. 5 is a longitudinal sectional view of a spring module of the present disclosure with a spring retainer plate reversed from the position of FIG. 2.
Figure 5A:
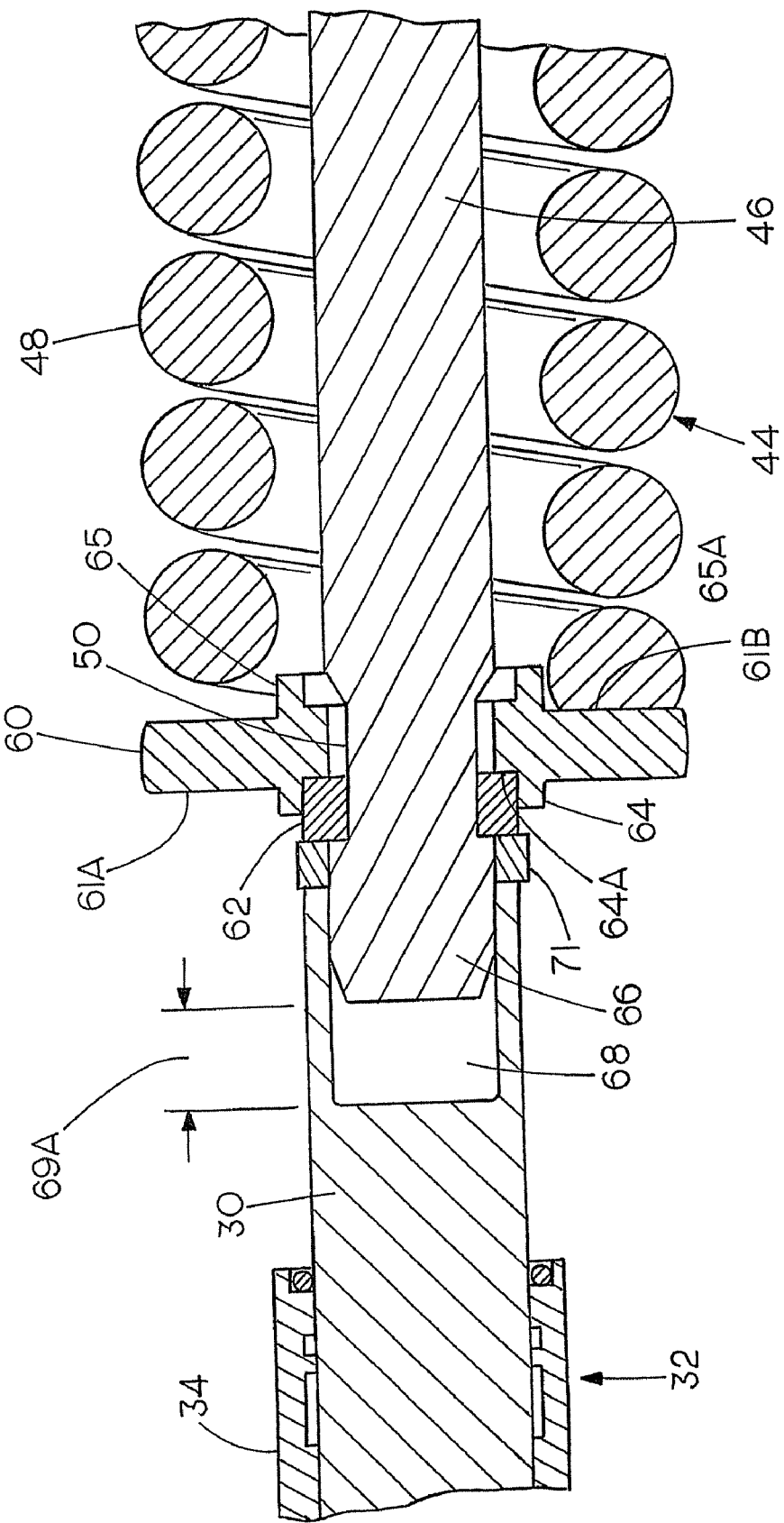
FIG. 5A is a fragmentary enlarged sectional view similar to FIG. 5 but with a spring retainer plate in the same position as in FIG. 2, and with an arrangement to increase the amount of spring travel with the same tensioning actuator or cylinder.

The lock collar 62 is held in place as the annular lip 64 of the spring plate 60 slips over the lock collar 62 and is in the position shown in FIGS. 2 and 5A. The lock collar will slide to the remote end (farthest from push block 52 and adjacent end portion 62) of the annular groove 50 and is held there to react loads when the spring 48 is under compression. The spring 48 is held between the push block 52 and the spring plate 60, as a separate subassembly or module, as shown in FIG. 5. The preload in compression on the spring 48 is determined by the difference between the free length of the spring and the distance between the spring plate 60 and the push block 52.

The spring shaft 46 end portion 66 that extends out beyond the spring plate 60 and which is slidably fitted in an end bore 68 of the cylinder piston shaft 30 guides the spring shaft 46 as the spring compresses. The lock collar 62 bears against the end surface of the shaft 30 surrounding the bore 68. The end of the shaft 30 is in contact with the lock collar 62 in an initial position. The bore 68 is of greater length than the shaft end portion 66 that slides into the bore 68. A space 69 is thus provided between the end of the spring shaft 46 and the inner end of the bore 68. The spring shaft end portion 66 can slide farther into the bore 68 than the initial assembled position shown in solid lines in FIGS. 2 and 5A. When the spring 48 is loaded by the tensioning roller until it compresses, that is, the load on the spring is greater than the preload, the spring plate 60 will be moved by the shaft 30 toward the push block 52, and the lock collar 62 and spring plate 60 will slide along the annular groove 50, while the end portion 66 of the spring shaft will slide farther into the bore 68. The lock collar 62 will be held in place against the end of shaft 30 as the spring shaft end portion 66 slides farther into the bore 68. This sliding of the end portion 66 accommodates compression of the spring from increases in tension in the track.

Figure 6A:
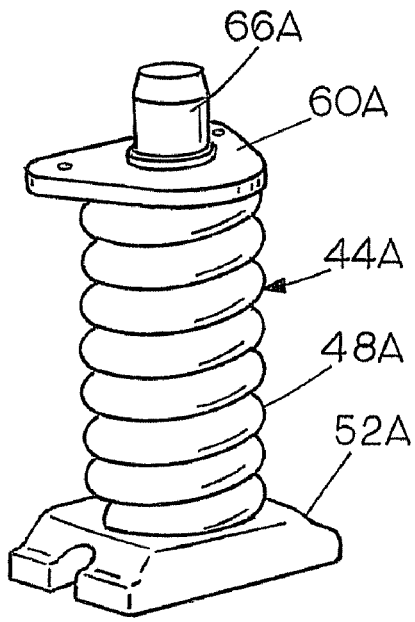
Figures 1, 6A:
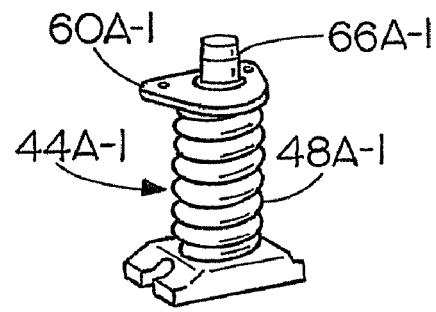
Figure 6B:
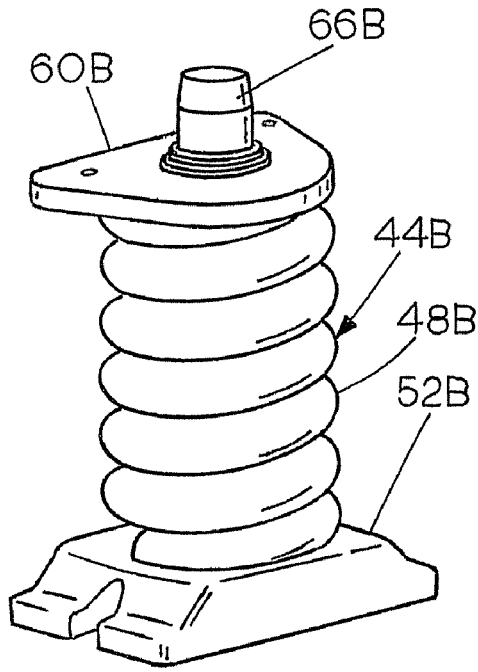
Figures 1, 6B:
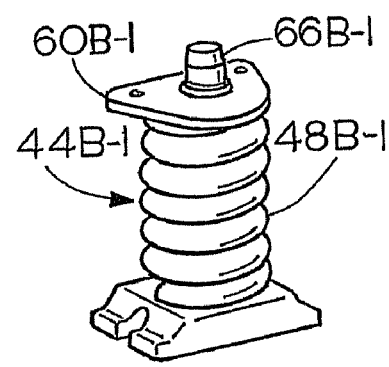
Figure 6C:
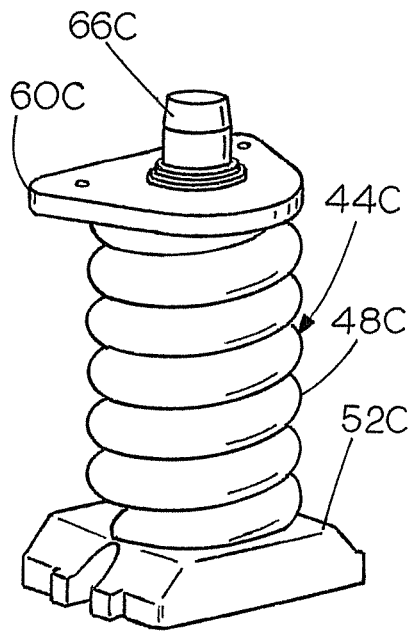
Figures 1, 6C:
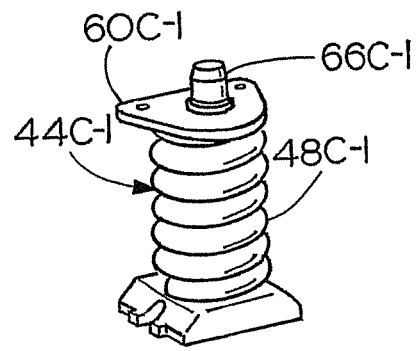
Figure 6D:
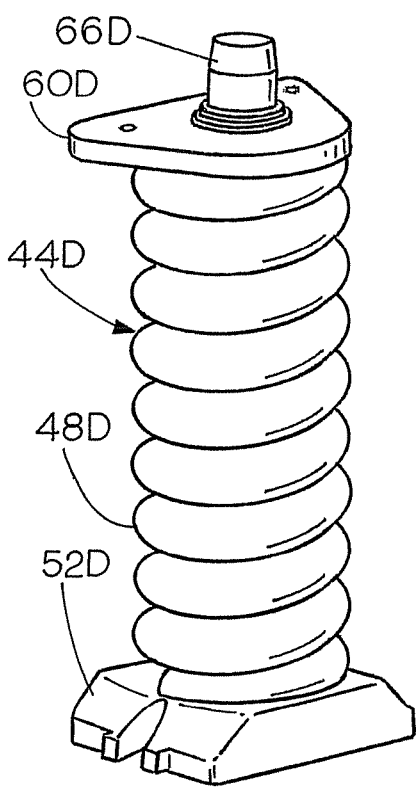
Figures 1, 6D:
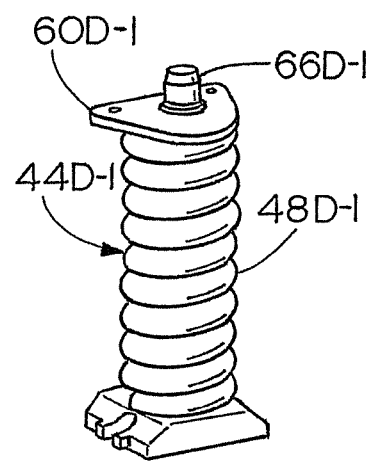
Figure 7:
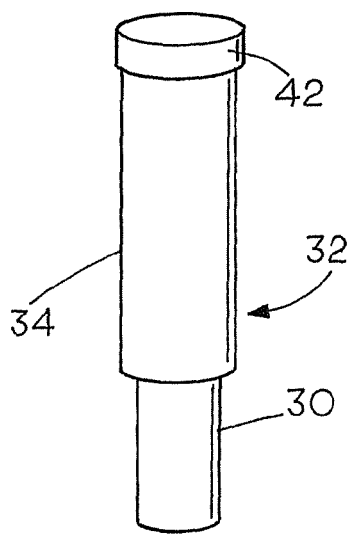
FIG. 7 is a perspective view of the cylinder module shown in FIG. 1.
Figure 7A:
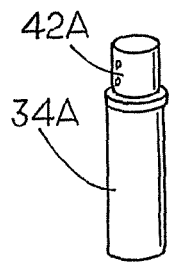
FIGS. 7A-7E are perspective views of various different configurations of actuators or cylinders usable with the present tensioner systems.
Figure 7B:
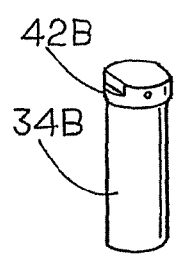
Figure 7C:
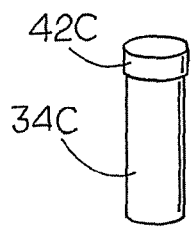
Figure 7D:
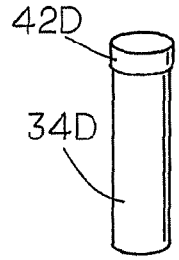
Figure 7E:
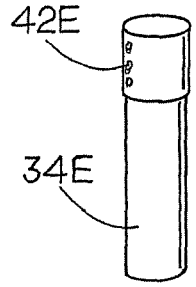

To change the pre-load on the spring, the spring plate 60 has a second side 61B and is reversible to the position shown in FIG. 5. The second side 61B of the spring plate 60 has a second interior bore recess formed by a second annular lip 65 that also will receive and retain collar 62 when the spring plate 60 is reversed, as shown in FIG. 5. A shoulder 65A formed by the second recess 65 is offset in an opposite direction from surface 61B from the direction of offset of shoulder 64A from surface 61A. In other words, when the spring plate is in the position shown in FIG. 5, the spring 48 is pre-loaded more (retained at a shorter length) than with the spring plate in the position shown in FIGS. 1, 2 and 5A. The difference in offset is illustrated by lines 67A and 67B, in FIG. 5, with line 67B being the relative position of surface 61B, when it is engaging the spring end as shown in FIG. 2, and line 67A is the position of surface 61A, which is engaging the spring end in FIG. 5, when the spring plate 60 is reversed from the FIG. 2 or FIG. 5A position.

The spring subassembly 44 is separately assembled as a module and is removable from the shaft 30 and the actuator or cylinder. There can be several spring subassemblies or modules having springs of different spring rates, different end blocks and different pre-loads, for example. The spring modules can be placed into the bores 68 of the piston/shaft of selected cylinder assemblies. In this way, different spring modules 44 can be made and one spring module can be replaced with another spring module mounted on the same cylinder assembly. The ability to separate the cylinder subassembly or module 32 from the spring subassembly or module 44 makes this possible.

In FIG. 5, the separate spring module 44 is illustrated, and the spring plate 60 has been reversed from the position in FIGS. 2 and 5A, as stated, to illustrate the ability to provide for different preloads on the spring 48 by reversing the position of the surfaces 61A and 61B of the spring plate 60.

FIG. 4 illustrates the components of the tensioner assembly 16 in an exploded view. The figure shows a conventional seal, a backup ring, a wear ring and a rod wiper indicated collectively at 37. A washer 51A that is used under nut 51 and an O-ring 67 used on shaft end 66 are also illustrated in FIG. 4.

The present track tensioner has modular construction that permits the spring subassembly or spring module to be separately mounted on grease cylinders or other actuators that may be used for providing initial positioning of the slide support and the track tensioning roller. The pre-load can be varied using the same parts and the reversible spring plate 60, so that reversing the spring plate will change the spring preload.

FIGS. 6A-6D and FIGS. 6A-1 to 6D-1 illustrate different spring modules 44A-44D and 44A-1-44D-1 with different spring lengths, diameters, and spring rates. The spring plates are shown at 60A-60D and 60A-1-60D-1. The springs are shown at 48A-48D and 48A-1-48D-1, and a selected range of spring rates and lengths are provided. The end portions of the spring shafts are shown at 66A-66D and 66A-1-66D-1 and these end portions can be varied to fit the actuator selected. The spring push blocks are shown at 52A-52D. Modules 44A-44D and 44A-1-44D-1 will work with the various cylinders selected as needed or desired.

Another feature is that the cylinder shaft 30 can be replaced for service without replacing the entire spring subassembly. Also, if a tensioner assembly requires a different overall length, a different length shaft 30 can be provided for ensuring that the spring subassembly is properly positioned.

The track tensioner thus has three essentially major components, including the spring subassembly or module 44, the grease cylinder subassembly or module 32, which is a cylinder including base 42, and cylinder tube 34 (which are welded together) and the piston shaft 30 that acts as the piston and rod of the cylinder assembly. The shaft 30 is not an integral part of the spring shaft, and the shaft 30 can be serviced as a separate part. The shaft 30 is preferably a hardened chrome shaft. Likewise, the spring and spring shaft module can be serviced and changed as a separate part from the piston shaft and cylinder subassembly 32. The ability to solidly fasten the push block 52 onto the end of shaft 46, as opposed to permitting some sliding action between the push block 52 and the shaft as in previous designs, makes the connection to the slide support and tensioning roller more robust, and provides a longer life to the spring subassembly.

The three components, namely the spring subassemblies or modules, the shafts for the actuator, which as shown are grease cylinders but can be other desired actuators, such as a screw or hydraulic actuator, and the actuator subassemblies, as shown a grease cylinder welded assembly, can be mixed and matched to create a variety of different final tensioner assemblies as needed for different applications.

Figure 8A:
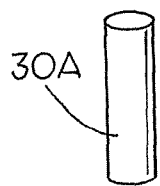
FIGS. 8A-8C are side views of different piston shafts usable with the cylinders of FIGS. 7A-7E.
Figure 8B:
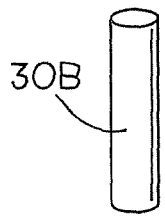
Figure 8C:
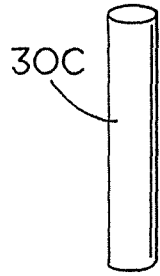

Variations in shaft length and sizes for the cylinder shafts are shown in at 30A, 30B, and 30C in FIGS. 8A-8C. In FIGS. 7A-7E, variations in the cylinders 34A-34E are shown. The bases 42A-42E also can be modified in these modules for different mounting arrangements. The cylinder modules, made up of selected cylinders having appropriate bases, and selected shafts, along with the spring modules shown in FIGS. 6A-6D and 6A-1 through 6D-1 can be selected for arriving at a spring tensioning system that is a proper track tensioning assembly, based on the weight and horsepower of the track driven vehicle, such as a loader or other work machine.

It can be seen in FIG. 2 that when the load on the spring push block 52 exceeds that which the pre-load on spring 48 will resist, the spring shaft end portion 66 will slide in the bore 68, to accommodate changes in position of the idler roller 18 caused by ground conditions, or increased track tension.

In FIG. 5A a view of the end of the piston shaft 30 and the bore 68 is shown with a spacer ring 71 surrounding the end portion 66 of spring shaft 46, and between the end surface of the piston shaft 30 and the lock ring 62. This moves the end portion 66 of spring shaft 48 farther from the inner end of bore 68 and the space indicated at 69A between the end of the bore 68 and the end of shaft portion 66 is increased. The amount that the end portion 66 can slide into the bore 68 is increased by the thickness in axial direction of the spacer ring 71. This means that more spring compression travel is available for different applications, such as changing from a rubber track to a steel track, since the steel tracks require about twice the amount of spring travel as rubber tracks. This increase in needed spring travel is obtained without replacing the entire tensioner assembly. The tensioner assembly had to be replaced when using previous spring and grease cylinder assemblies that did not have a modular spring. The slide groove 50 on shaft 46 is of length to permit the increased spring travel with the spacer ring 71 installed.

When the unit is assembled in place, the end portion 66 of the spring shaft 46 is permitted to slide back and forth as schematically illustrated by the dimension 69 between arrows.

Although the present invention has been described with reference to preferred embodiments, workers skilled in the art will recognize that changes may be made in form and detail without departing from the spirit and scope of the invention.

What is claimed is:

1. A tensioning assembly for providing a tensioning force onto a flexible endless member, comprising a compression spring, a spring shaft, the spring surrounding the spring shaft, a pair of spring retainers on the spring shaft, a first of the spring retainers being fixed to an end of the spring shaft, and a second spring retainer slidably held on the spring shaft, and retaining the spring in an initial length position between the first and second retainers, the spring shaft having an end portion extending from the second spring retainer, a support actuator having an adjustable length between a base portion and an actuator portion, the shaft portion having a bore in an outer end for slidably receiving the end portion of the spring shaft with the outer end of the shaft portion coupled to the second spring retainer for reacting loads on the first spring retainer tending to compress the spring from its initial length position, and the bore in the actuator portion being of a length to permit the end portion of the spring shaft to slide farther into the bore as the spring is compressed from its initial length position.

2. The tensioning assembly of claim 1, and a sliding lock collar slidably mounted on the spring shaft abutting a surface of the second spring retainer for holding the second spring retainer against axial loads exerted by the spring, the lock collar sliding along the shaft when the spring is compressed from an initial length, the second spring retainer having two sides for engaging the spring and being configured to change the initial length of the spring as a function of which of the two sides engages the spring.

3. The tensioning assembly of claim 1, wherein the spring and the first and second spring retainers are removable from the bore of the actuator portion as a unit.

4. The tensioning assembly of claim 1, wherein said actuator shaft comprises a piston in an outer cylinder forming a part of the actuator.

5. A modular track tensioner for the track on a track driven vehicle having a frame, the track tensioner, comprising:
a spring subassembly, said spring subassembly having a spring shaft, a spring surrounding said shaft, a first spring retainer rigidly connected to said spring shaft at a first end thereof, and a movable second spring retainer mounted for sliding movement on the spring shaft and in one stopped position holding a second end of the spring on the shaft so that a second end of the spring shaft extends beyond the second spring retainer, the second spring retainer sliding relative to the spring shaft when loads on the first spring retainer shorten the spring;
an actuator having a movable actuator portion, the actuator portion slidably supporting a second end portion of the spring shaft and engaging the second spring retainer; and
a loading assembly for said actuator portion to provide a force in a direction to resist movement of the second slidable spring retainer when the spring tends to shorten from a force on the first spring retainer.

6. The modular track tensioner of claim 5, wherein said actuator portion is mounted in a cylinder and acts as a piston in the cylinder, said cylinder being anchored relative to a portion of a vehicle frame, and the loading assembly including a filling in the cylinder for adjustably positioning the actuator portion relative to the cylinder.

7. The modular tensioner of claim 5 wherein said actuator is adjustable in length.

8. The modular track tensioner of claim 5, wherein the actuator portion has a bore for slidably receiving a second end portion of the spring shaft, and wherein the second movable spring retainer comprises a lock ring slidably mounted in a retaining groove on the spring shaft that bears against an end surface of the actuator portion surrounding the bore.

9. The modular track tensioner of claim 7 and a spacer ring adapted to be placed between the end surface of the actuator portion and the lock ring.

10. The modular track tensioner of claim 6 wherein the filling in the cylinder is a grease.

11. The modular tensioner of claim 8 wherein the lock ring is in an annular groove on the shaft so that the lock ring is in a stopped position by spring loading from the spring, a spring retainer end plate between the lock ring and the spring, the spring retainer end plate having surfaces engagable by the lock ring on opposite sides thereof and configured to change the distance along the shaft between the lock ring and the second end of the spring when the spring retainer plate is reversed from a first position with a first side of the spring retainer end plate engaging the lock ring.

12. The modular tensioner of claim 11 further comprising an annular lip on each side of the spring retainer end plate configured to surround the lock ring when a respective side of the spring retainer end plate is engaging the lock ring.

13. The modular tensioner of claim 5 further comprising an annular groove formed on the shaft adjacent to the second end of the spring shaft, the second movable spring retainer comprising a lock ring mounted in the annular groove, the lock ring engaging a shoulder surface formed at an end of the annular groove in the stopped position.

14. A method of providing a spring tensioning assembly for a track vehicle comprising:
   providing an extendable and retractable actuator having an actuator shaft extending from one end;
   providing a spring module having a spring and spring shaft with the spring retained on the spring shaft;
   removably coupling the spring shaft to the actuator shaft in an assembly with the actuator shaft bearing on the spring to compress and load the spring to tension a track of the track vehicle, the spring shaft being slidable relative to the actuator shaft when the spring changes in length from an initial position, due to changing tension loads on the track; and
   providing a bore in an end of the actuator shaft, slidably mounting an end of the spring shaft in the bore, and providing a spring retainer on the spring shaft to transfer loads from the actuator shaft to the spring.

15. The method of claim 14, comprising selecting one actuator and one actuator shaft from a plurality of different actuators and different actuator shafts, and forming the spring module from one spring of a plurality of different springs and one spring shaft from a plurality of different spring shafts to form a tensioning assembly compatible with loads on the track of the track vehicle.

* * * * *

UNITED STATES PATENT AND TRADEMARK OFFICE
CERTIFICATE OF CORRECTION

| | | |
|---|---|---|
| PATENT NO. | : 8,079,650 B2 | Page 1 of 1 |
| APPLICATION NO. | : 12/434901 | |
| DATED | : December 20, 2011 | |
| INVENTOR(S) | : Thomas J. Tokach et al. | |

It is certified that error appears in the above-identified patent and that said Letters Patent is hereby corrected as shown below:

Title Page

Item [75], Inventors, delete "William Shelbroun" and insert --William Shelbourn--.

Signed and Sealed this
Sixth Day of March, 2012

David J. Kappos
*Director of the United States Patent and Trademark Office*